A. E. SMITH.
CARRIAGE AXLE.

No. 243,807. Patented July 5, 1881.

Witnesses:
T. E. Brecht
J. A. Rutherford

Inventor:
Alfred E. Smith,
by James L. Norris
Attorney.

UNITED STATES PATENT OFFICE.

ALFRED E. SMITH, OF BRONXVILLE, NEW YORK.

CARRIAGE-AXLE.

SPECIFICATION forming part of Letters Patent No. 243,807, dated July 5, 1881.

Application filed August 13, 1878.

*To all whom it may concern:*

Be it known that I, ALFRED E. SMITH, of Bronxville, in the county of Westchester and State of New York, have invented certain new and useful Improvements in Carriage-Axles, of which the following is a specification.

My invention relates to hub attachments for carriages or other vehicles, and the novelty consists in the novel construction and arrangements of parts, as will be hereinafter more fully set forth.

Figure 1:
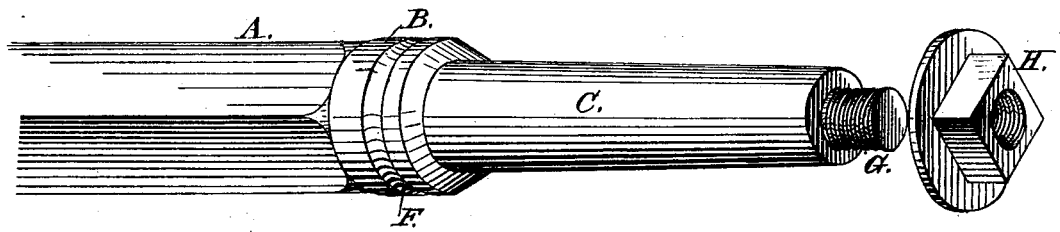
Figure 2:
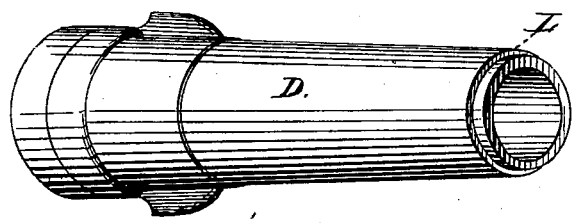
Figure 3:
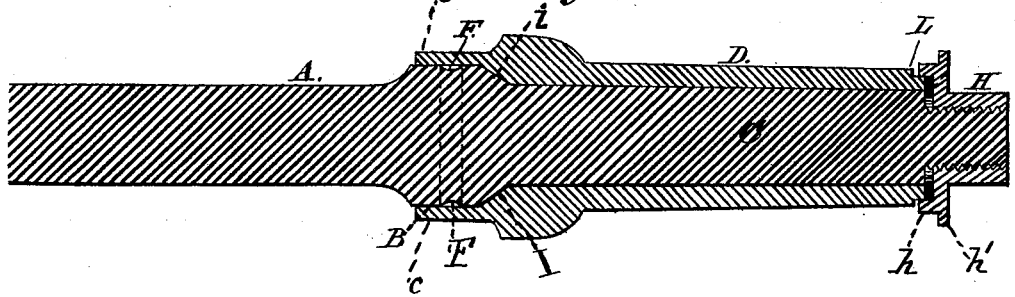

In the accompanying drawings, which form a part of this specification, Figure 1 is a perspective view of the axle-spindle and enlarged bearing-surface with the screw-cap detached. Fig. 2 is a perspective view of the box or hub cylinder, showing the rabbet which operates in connection with the peculiar screw-cap, and also the enlarged portion which operates over the enlarged bearing upon the axle; and Fig. 3, a central longitudinal section, showing the several parts in position.

The object of this invention is to provide a cheap, simple, and efficient hub-bearing and attachment, easy of manufacture and not liable to get out of order. To this end I provide an axle which is swaged or upset in the ordinary manner to form an enlarged bearing having inclined sides, in the center of which I form an annular groove. The periphery of this enlarged bearing is parallel with the plane of the axle and operates within an enlarged portion of the box or hub-cylinder which extends over its entire surface. The box makes a close joint to prevent the ingress of dust or grit; but in case any should enter at that point, its deleterious effect will only be experienced upon the small annular space between the rear of the box and the annular groove in the enlarged bearing, which serves to catch and retain all such grit, as in a cup. Upon the outer end is provided a shoulder and a portion of smaller diameter which is screw-threaded to receive a screw-cap, which has a nut, a disk, and an annular projection, all formed in one piece. The disk serves to bear against the hub, while the annular projection serves to hold a cushion-washer, and the extremities to operate in a rabbet formed in the outer end of the box. The inner surface of the box has an incline to correspond with the incline upon the axle, and is provided with ears, as usual in such devices.

It will be understood that the gist of this invention lies in the enlarged bearing upon the axle, having the dust-catching annular groove, the peculiarly-formed box having the enlarged bearing-extension upon one end and the annular rabbet upon the other, and in the peculiar screw-cap, all other parts not being sought to be covered in this application.

Referring to the drawings, A represents the axle, C the spindle having threaded extremity, and E the box. Formed upon the axle in any ordinary and well-known manner— such as swaging or upsetting—is an enlarged bearing, B, having true inclined outer surfaces, I, and having its periphery on a true plane with the longitudinal plane of the axle. Nearer the outer than the inner terminus of this bearing B, I form an annular groove or recess, F, the object of which is to catch and retain any dust which might enter from the inner side. The box D is provided with the ordinary holding-ears, and is of ordinary construction, except that it has an enlarged cylindrical inner extremity, c, which operates over the bearing B to make a close joint, and extends sufficiently inward to leave considerable bearing-space inside of the dust-recess F. Upon its inner surface is formed an incline, *i*, which corresponds exactly with the incline I upon the axle. Upon the outer end of the box is formed an annular rabbet, L, within which operates an annular projection, *h*, formed upon the inner surface of a disk, *h'*, and in one with the threaded sleeve H, as shown. These parts H *h' h* form the screw-cap and are cast or otherwise made. The annular projections *h* serve to hold a perforated flexible washer, to allow slight play between the shoulders I and the screw-cap.

It will be observed that the enlarged bearing, formed as shown, and provided with the dust-catcher, the box having the portion *c* and rabbeted, as shown, in connection with the peculiar screw-cap H *h h'*, forms a complete device for the purposes designed, and that the device is useful and efficient.

I am aware that enlarged bearings swaged or upset upon an axle is not new. I am aware that inclines on box and axle similar to the parts I *i* in this application are not new. I am aware that annular grooves near the center of the spindle for lubricating purposes are not new. I am aware that caps, disks, and other devices have been used to exclude dust. I am aware that cushions held in screw-caps are not new. I am aware that various grooves and recesses have been employed to catch, hold, and feed lubricants. These devices, being old and well known, are not sought to be covered, broadly, in this application. I am not aware, however, that a dust-catching annular recess sufficiently near the inner end of the bearing to allow but little frictional or grinding surface, if grit should enter, and to catch and hold the same from further passage inward, in connection with an enlarged bearing-surface, and a close-fitting cylindrical box portion, in connection with inclined bearings, a screw-cap having hub-bearing disk, annular projection to hold a cushion and operate adjustably upon the rabbet of a box, and threaded sleeve for securing and adjusting, has been before known or employed as an entire device for the purposes specified, and in the combination of these parts as specifically set forth and shown lies the gist of this invention.

What I claim as new, and desire to secure by Letters Patent, is—

In a hub attachment for carriages or other vehicles, the axle A C, having swaged or upset thereon the enlarged cylindrical bearing B, in which is formed an annular dust-catching recess, F, and having shouldered and threaded outer end, and also inclines I, as shown, the box D, having incline *i*, cylindrical inner extremity *c*, to make close joint with bearing B, and rabbeted at L, the screw-cap H, having bearing-disk $h'$, and annular projection $h$, forming cushion-cup, and operating within the rabbet L, all constructed, arranged, combined, and adapted to serve as and for the purposes specified.

In testimony that I claim the foregoing I have hereunto set my hand in the presence of the subscribing witnesses.

ALFRED E. SMITH.

Witnesses:
JAMES L. NORRIS,
JAS. A. RUTHERFORD.